(12) United States Patent
Bhongale et al.

(10) Patent No.: US 10,221,682 B2
(45) Date of Patent: Mar. 5, 2019

(54) DOWNHOLE SENSING SYSTEMS AND METHODS EMPLOYING SQUEEZED LIGHT INTERFEROMETRY

(71) Applicant: HALLIBURTON ENERGY SERVICES, INC., Houston, TX (US)

(72) Inventors: Satyan G. Bhongale, Houston, TX (US); Christopher L. Stokely, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/116,499

(22) PCT Filed: Feb. 28, 2014

(86) PCT No.: PCT/US2014/019231
§ 371 (c)(1),
(2) Date: Aug. 3, 2016

(87) PCT Pub. No.: WO2015/130299
PCT Pub. Date: Sep. 3, 2015

(65) Prior Publication Data
US 2017/0009571 A1     Jan. 12, 2017

(51) Int. Cl.
*G01D 5/353*     (2006.01)
*E21B 47/12*     (2012.01)
(Continued)

(52) U.S. Cl.
CPC ............ *E21B 47/123* (2013.01); *E21B 47/01* (2013.01); *E21B 47/06* (2013.01); *E21B 47/065* (2013.01);
(Continued)

(58) Field of Classification Search
CPC ............... G01D 5/353; G01D 5/35303; G01D 5/35306; G01D 5/35309; G01D 5/35312; G01D 5/35316; G01D 5/35319
See application file for complete search history.

(56) References Cited

U.S. PATENT DOCUMENTS 5,535,000 A * 7/1996 Shirasaki .................. G01J 9/02
356/483
6,522,797 B1 * 2/2003 Siems .................... G01H 3/005
250/227.14
(Continued)

FOREIGN PATENT DOCUMENTS

WO  2011/078869  6/2011
WO  2015/130299  9/2015

OTHER PUBLICATIONS

AU Patent Examination Report, dated Sep. 2, 2016, Appl No. 2014384701, "Downhole Sensing Systems and Methods Employing Squeezed Light Interferometry," Filed Feb. 28, 2014.
(Continued)

*Primary Examiner* — Jonathan Hansen
(74) *Attorney, Agent, or Firm* — Gilliam IP PLLC

(57) ABSTRACT

An illustrative downhole sensing system includes a phase-squeezer assembly, an interferometer with a downhole sensor on the sensing path, and a receiver. The phase squeezer assembly provides a phase-squeezed laser beam, preferably with a squeeze parameter greater than 2. Certain embodiments include a pulse generator that gates the phase-squeezed laser beam to form a sequence of phase-squeezed laser pulses, and may further include a compensator that converts the sequence of pulses into a sequence of double pulses with a slight frequency shift between the pulses in each pair. The interferometer conveys a reference portion of the phase-squeezed laser beam along a reference path and a sensing portion of the phase-squeezed laser beam along a
(Continued)

sensing path. A downhole sensor along the sensing path provides the sensing portion of the phase-squeezed laser beam with a measurement-parameter dependent phase shift relative to the reference portion of the phase-squeezed laser beam, which is measured by the receiver.

22 Claims, 4 Drawing Sheets

(51) Int. Cl.
  *E21B 47/01* (2012.01)
  *E21B 47/06* (2012.01)
  *E21B 47/14* (2006.01)
  *G01B 9/02* (2006.01)
  *G01V 8/16* (2006.01)

(52) U.S. Cl.
  CPC .............. *E21B 47/14* (2013.01); *G01B 9/02* (2013.01); *G01V 8/16* (2013.01)

(56) References Cited

U.S. PATENT DOCUMENTS

| | | | |
|---|---|---|---|
| 7,245,382 B2 * | 7/2007 | Ronnekleiv | G01B 9/02007 356/477 |
| 8,637,444 B2 | 1/2014 | Duncan et al. | |
| 9,726,472 B1 * | 8/2017 | Diels | G01B 9/02049 |
| 2012/0257475 A1 | 10/2012 | Luscombe et al. | |

OTHER PUBLICATIONS

Mehmet, Moritz et al., "Squeezed Light at 1550nm with a Quantum Noise Reduction of 12.3 dB", *Optical Society of America, Optics Express 25763*, vol. 19, No. 25, Dec. 5, 2011, 10 pgs.

Vahlbruch, Henning et al., "Observation of Squeezed Light with 10-dB Quantum-Noise Reduction", The American Physical Society, *Physics Review Letters*, 100, 033602, Jan. 25, 2008, 4 pgs.

Safavi-Naeini, Amir H. et al., "Squeezed Light from a Silicon Micromechanical resonator", *Nature 12307*, vol. 500, Aug. 8, 2013, p. 185-189, Macmillan Publishers Limited.

PCT International Search Report and Written Opinion, dated Nov. 24, 2014, Appl No. PCT/US2014/019231, "Downhole Sensing Systems and Methods Employing Squeezed Light Interferometry," Filed Feb. 28, 2014, 15 pgs.

* cited by examiner

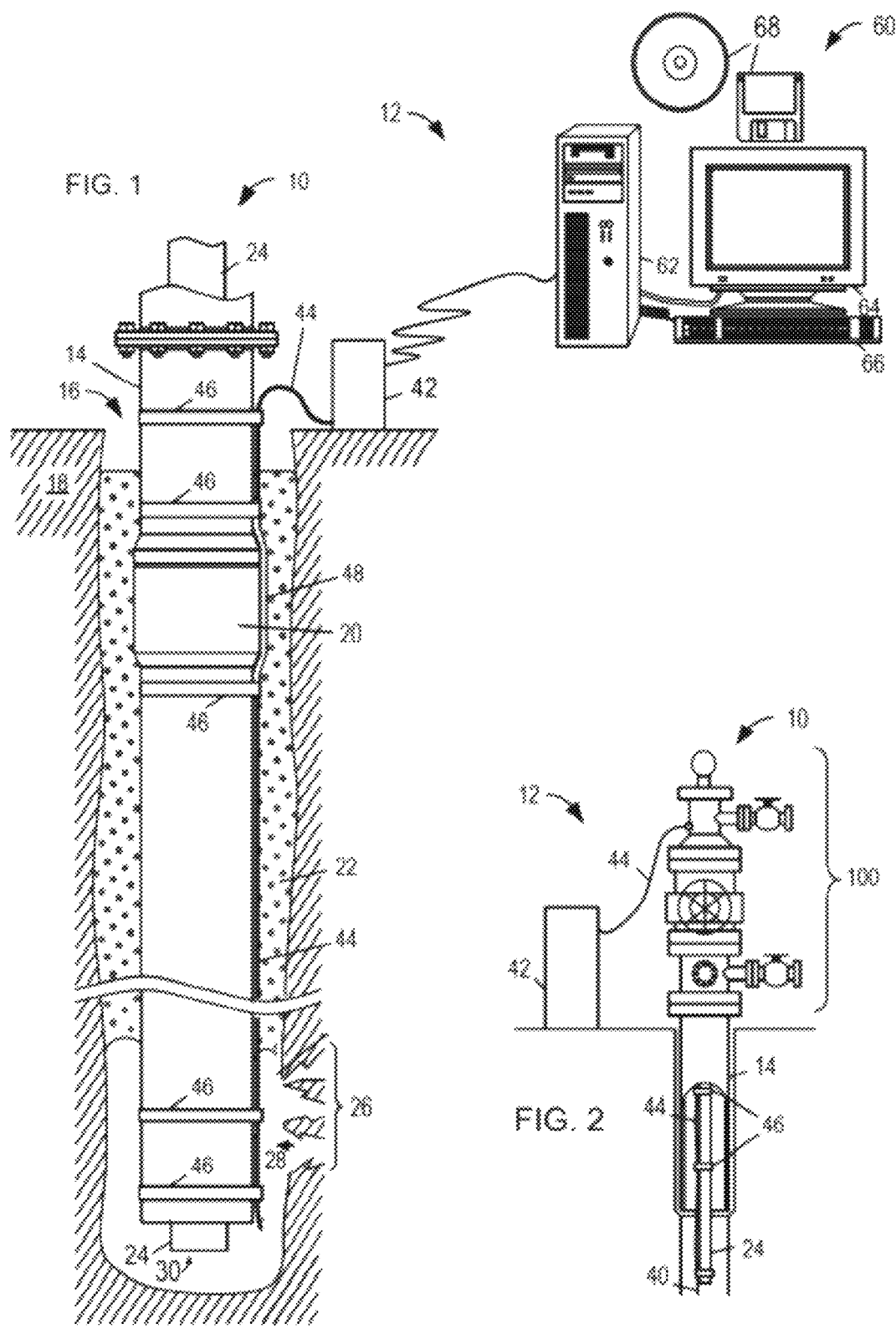

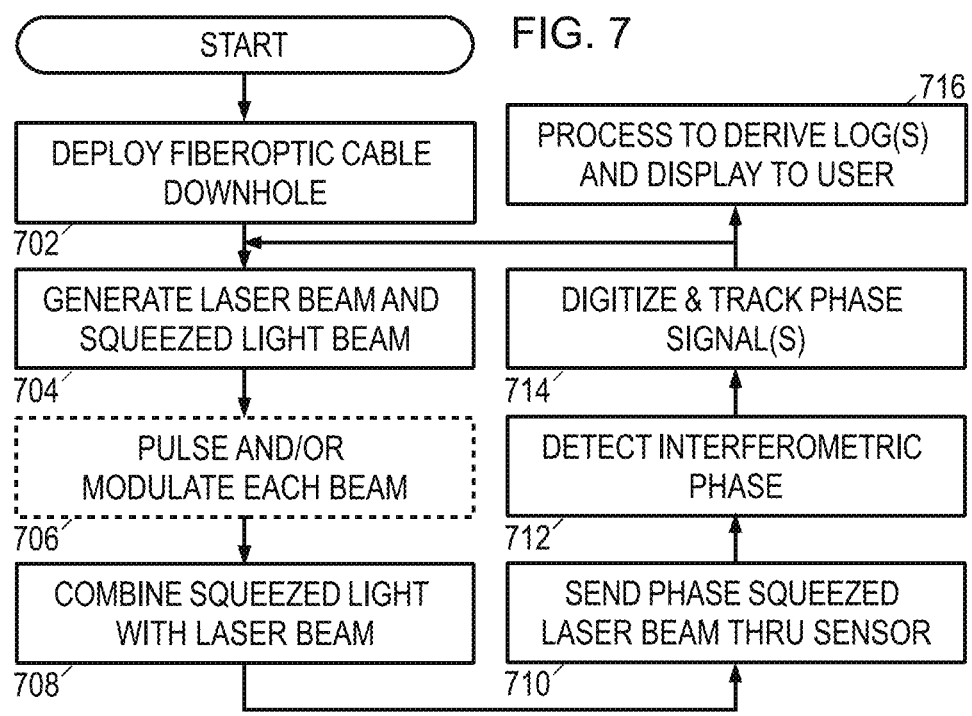

DOWNHOLE SENSING SYSTEMS AND METHODS EMPLOYING SQUEEZED LIGHT INTERFEROMETRY

BACKGROUND

Distributed optical sensing technology is proving to be suitable for a number of downhole oil and gas applications ranging from temperature sensing to passive seismic monitoring. One particularly advantageous aspect of this technology is that it enables the downhole components of the system to be passive, i.e., the electronics can be kept at the surface and not in the wellbore. As the technology evolves to develop new and improved systems for increasing performance and sensitivity, certain obstacles have been encountered. For example, fiber optic distributed sensing techniques often rely on (but do not necessarily require) monitoring of the slight backscattering of injected light from the highly-transparent fiber core. The properties of this backscattered light can provide sensitivity to various downhole parameters, such as the temperature at a specific location of the fiber. However, as the length of the fiber increases, the injected light and backscattered light suffers from increased attenuation from various loss mechanisms. This attenuation can be compensated through the use of higher power light sources, but this approach is limited by the nonlinear behavior of the optical fiber generating other unwanted effects at high laser intensities. Therefore, very weak signals can be commonplace in some distributed optical sensing systems.

When working with very weak signals, measurement noise such as noise introduced by the sensor, receiver electronics, and other unavoidable noise sources, becomes a prominent issue. For very long fiber optic lengths on ultra-deep/ultra-long oil and gas boreholes the signals could be as weak as a single photon at a time. Existing systems cannot perform adequately in this regime as they lack proper handling of noise. Furthermore, when the signal strength drops below a point where it can be described by few tens to hundreds of photons, quantum effects need to be accounted for.

BRIEF DESCRIPTION OF THE DRAWINGS

Accordingly, there are disclosed in the drawings and the following description various downhole sensing systems and methods employing squeezed light interferometry. In the drawings:

FIG. 1 shows an illustrative downhole optical sensor system in a production well.

FIG. 2 shows an alternative downhole optical sensor system embodiment.

FIG. 7 is a flowchart of an illustrative squeezed light interferometry method.

Figure 3A:
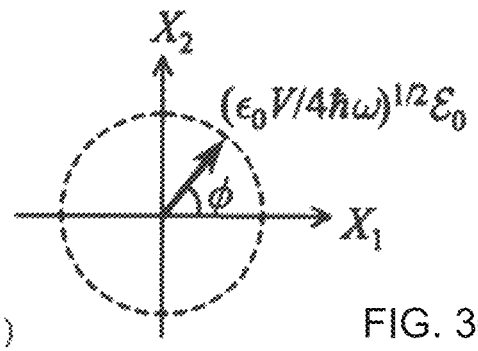
FIGS. 3(*a*)-3(*f*) explain certain squeezed states for light.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The obstacles outlined above are at least in part addressed by the disclosed downhole sensing systems and methods employing squeezed light interferometry. Some disclosed embodiments include a phase-squeezer assembly, an interferometer with a downhole sensor on the sensing path, and a receiver. The phase squeezer assembly provides phase-squeezed light, preferably with a 'squeeze parameter' value greater than two. The interferometer uses a beam splitter or 2×2 coupler with the squeezed light (also called a "squeezed state") and a laser beam at the input ports. The beam splitter (or coupler) couples the combined light to two optical beam paths forming the arms of an interferometer, as described further below with respect to FIG. 4. Either of the optical beam paths can be designated as a sensing path and the remaining path as the reference. The reference and the sensing paths of the interferometer can be in free space, guided via optical fiber, or guided by some other form of waveguide. Light travelling along the reference and sensing paths are called reference beams and sensing beams, respectively. A sensor along the sensing path provides the sensing beam with a measurement-parameter dependent phase shift relative to the reference beam. The reference and the sensing beams are mixed at the output port of the interferometer by using a beam splitter (or 2×2 coupler) similar to the one above. The two beams emerging out of the beam splitter are captured by the receiver, where interference occurs. This phase difference is reflected in the intensity of the difference signal. The photodetectors along with the combiner that generates the difference signal form the receiver.

Certain sensing embodiments, particularly distributed ones, may modulate the squeezed light to enable each interferometric phase measurement to be associated with a specific position along the distributed sensing fiber. Pulse modulation and continuous wave modulation can be employed in this fashion. Some embodiments further minimize downhole components with the use of reflective terminators to fold the optical paths of the interferometers upon themselves and using circulators to separate the input ports of the interferometer from the output.

For downhole applications, optical fibers may be used to provide the optical beam paths of the interferometer. Intrinsic impurities distributed along the length of the fiber backscatter some portion of the light, thus acting as a continuum of virtual mirrors and enabling the fiber itself to act as the sensor. The time-of-flight of the backscattered light determines the location of the virtual mirror, thereby enabling the fiber to be analytically divided into many definite, finite spatial regions. The parameter to be measured affects the physical properties in each such spatial region of the fiber causing a phase shift of light travelling through it. The receiver may then measure the phase shifts to monitor the measurement parameter in each spatial region.

Some system embodiments use a single fiber for both the optical beam paths of the interferometer. In such situations, the two beams are distinguished by pulsing in time or using two orthogonal polarizations. Appropriate delay coils are added to adjust the time of flight for the two beams thereby allowing them to reach the receiver at the same time.

The disclosed techniques are best understood in an application context. Turning now to the figures, FIG. 1 shows a well 10 equipped with an illustrative embodiment of a downhole optical sensor system 12 with which squeezed light interferometry may be employed. A drilling rig has been used to drill and complete the well 10 in a typical manner, with a casing string 14 positioned in the borehole 16 that penetrates into the earth 18. The casing string 14 includes multiple tubular casing sections (usually about 30 foot long) connected end-to-end by couplings 20. (FIG. 1 is not to scale. Typically the casing string includes many such couplings.) Within the well 10, a cement slurry 22 has been injected into the annular space between the outer surface of the casing string 14 and the inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure.

The downhole optical sensor system 12 includes an interface 42 coupled to a fiber optic cable 44 for distributed downhole sensing. The interface 42 is located on the surface of the earth 18 near the wellhead, i.e., a "surface interface". In the embodiment of FIG. 1, the fiber optic cable 44 extends along an outer surface of the casing string 14 and is held against the outer surface of the of the casing string 14 at spaced apart locations by multiple bands 46 that extend around the casing string 14. A protective covering may be installed over the fiber optic cable 44 at each of the couplings 20 of the casing string 14 to prevent the cable 44 from being pinched or sheared by the coupling's contact with the borehole wall. In FIG. 1, a protective covering 48 is installed over the fiber optic cable 44 at the coupling 20 of the casing string 14 and is held in place by two of the bands 46 installed on either side of coupling 20.

In at least some embodiments, the fiber optic cable 44 terminates at surface interface 42 with an optical port adapted for coupling the fiber(s) in cable 44 to a light source and a detector. The light source transmits light pulses along the fiber optic cable 44, which contains scattering impurities. As each pulse of light propagates along the fiber, some of the pulse is scattered back along the fiber from every point on the fiber. The optical port communicates the backscattered light to the detector. As will be explained in greater detail below, the detector responsively produces electrical measurements of backscattered light phase shift at each point in the fiber. From the phase shift, the value of the measurement parameter sensed by the fiber at the location of the back-reflection or backscatter is determined. As described here, the light is reflected back by impurities along the entire length of the fiber. Thus the entire fiber acts as a sensor—a distributed sensor.

The illustrative downhole optical sensor system 12 of FIG. 1 further includes a computer 60 coupled to the surface interface 42 to control the light source and detector. The illustrated computer 60 includes a chassis 62, an output device 64 (e.g., a monitor as shown in FIG. 1, or a printer), an input device 66 (e.g., a keyboard), and non-transient information storage media 68 (e.g., magnetic or optical data storage disks). However, the computer may be implemented in different forms including, e.g., an embedded computer permanently installed as part of the surface interface 42, a portable computer that is plugged into or wirelessly linked to the surface interface 42 as desired to collect data, and a remote desktop computer coupled to the surface interface 42 via a wireless link and/or a wired computer network. The computer 60 is adapted to receive the electrical measurement signals produced by the surface interface 42 and to responsively determine a distributed parameter such as, e.g., distributed temperature sensing along the length of the casing string, or distributed sensing measurements of acoustic energy, vibrational energy (including active or passive seismic), pressure, strain, deformation, chemical concentrations, nuclear radiation intensity, electromagnetic energy, and/or acceleration (including gravity).

In at least some implementations, the non-transient information storage media 68 stores a software program for execution by computer 60. The instructions of the software program cause the computer 60 to collect phase differences of backscattered light received as an electrical signal from surface interface 42 and, based at least in part thereon, to determine downhole parameters such as acoustic signals at each point on the fiber 44. The instructions of the software program may also cause the computer 60 to display the acoustic waveforms or envelopes associated with each point on the fiber via the output device 64.

FIG. 2 shows an alternative embodiment of downhole optical sensor system 12 having the fiber optic cable 44 strapped to the outside of the production tubing 24 rather than the outside of casing 14. Rather than exiting the well 10 from the annular space outside the casing, the fiber optic cable 44 exits through an appropriate port in the "Christmas tree" 100, i.e., the assembly of pipes, valves, spools, and fittings connected to the top of the well to direct and control the flow of fluids to and from the well. The fiber optic cable 44 extends along the outer surface of the production tubing string 24 and is held against the outer surface of the of the production tubing string 24 at spaced apart locations by multiple bands 46 that extend around the production tubing string 24. The downhole optical sensor system 12 of FIG. 2 optionally includes a hanging tail 40 at the bottom of a borehole. In other system embodiments, the fiber optic cable 44 may be suspended inside the production tubing 24 and held in place by a suspended weight on the end of the fiber.

Before proceeding, a few remarks about the quantum nature of light are in order. Light energy is transported by photons, which have the properties of both particles and waves as set forth by the principles of quantum mechanics. The behavior of photons and other fundamental particles can be expressed in terms of a "probability wave" which is a probabilistically-weighted combination of multiple states. Quantum mechanics expresses the observation or measurement of a property of such a wave as an operator. If multiple properties are to be measured, it is often the case that the outcome is affected by the order in which the measurements are performed, i.e., the operators are not commutative. For certain pairs of properties, e.g., position and momentum, energy and time, amplitude and phase, there is a residual uncertainty that cannot be eliminated. The most famous expression of this is the Heisenberg uncertainty principle:

$$\Delta x \Delta p \geq h/4\pi$$

Such pairs of properties may be referred to as conjugate quadrature components, conjugate variables, or when used in context, simply as quadratures. For our purposes here, the relevant conjugate variables are amplitude (i.e., number of photons n) and phase $\phi$.

Where the number of photons is large enough for a light beam to be represented classically, the state of the light at a given time and position can be expressed as an exact phasor as shown in FIG. 3A, with a definite phase $\phi$ and a definite amplitude $$\left(\frac{\epsilon_0 V}{4hf}\right)^{\frac{1}{2}} E_0.$$

Figure 3B:
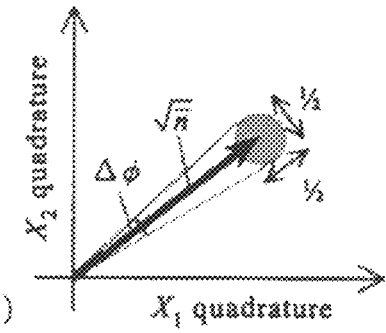

The phase changes with time or position so that the phasor rotates through the quadratures. As indicated in FIG. 3B, however, as the number of photons n decreases, the region of uncertainty at the end of the phasor starts to become significant. The phasor has an amplitude uncertainty and a phase uncertainty such that $$\Delta n \Delta \phi \geq 1/4$$

The state of coherent laser light $|\alpha\rangle$ may be expressed as a superposition of photon number states $|n\rangle$ with state probability $|\alpha^n/\sqrt{n!}|^2$:

$$\left|\alpha\right> = \sum_{n=1}^{\infty} \frac{\alpha^n}{(n!)^{\frac{1}{2}}} \left|n\right>$$

The mean photon number is $[n]=|\alpha|^2$, with $\alpha$ representing the complex amplitude. With this we can easily define the spread in the number of photons about the mean value $[n]$ as $\Delta n=[n]^{1/2}$ and a resulting minimum phase spread of $$\Delta \phi_{min} = \frac{1}{4[n]^{1/2}}$$

As the mean photon number grows larger, the phase uncertainty approaches the classical case.

Figure 3C:
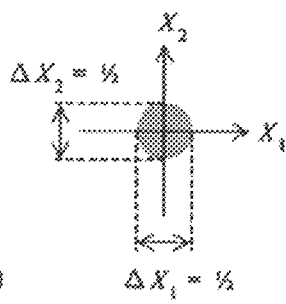
Figure 3D:
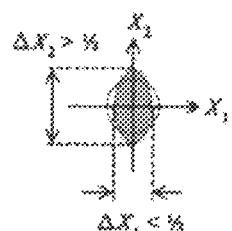
Figure 3E:
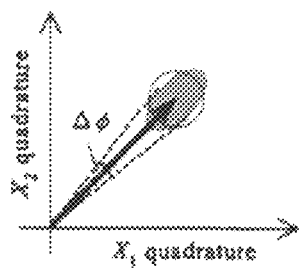
Figure 3F:
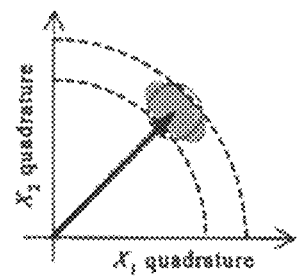

FIG. 3C shows the intrinsic uncertainty of the so-called "vacuum state" which has a mean photon number of 0. The intrinsic uncertainty of this state is symmetric, i.e., the uncertainty is shared equally between both conjugate variables. This situation may be contrasted with the squeezed vacuum state of FIG. 3D, in which the reduced uncertainty of one conjugate variable is achieved at the expense of an increased uncertainty in the other. Such squeezing can also be achieved with non-vacuum states. FIG. 3E represents light in a phase-squeezed state, while FIG. 3F represents light in an amplitude-squeezed state.

Distributed sensing and other interferometry-based measurements have a signal-to-noise ratio (SNR) that is limited by the phase uncertainty. In many systems, this phase uncertainty is determined by the instrument noise and interference from other sources, but it is expected that these noise sources can be largely eliminated with proper system characterization via feedback techniques and signal processing. The residual limit on SNR will then depend on the relationship between the light source and the fundamental limits imposed by nature. The implementation of squeezed-light techniques will yield significant improvements in sensor fidelity, sensitivity, and reliability. Accordingly, the disclosed systems employ a laser source and a squeezing module to generate squeezed light, and specifically, light in a phase-squeezed state.

A number of squeezed light generation techniques are provided in the literature. See, e.g., D. F. Walls and G. J. Milburn, *Quantum Optics* ($2^{nd}$ Ed), Springer-Verlag, Berlin, pp 171-173 (2008); M. Mehmet et al., "Squeezed light and 1550 nm with a quantum noise reduction of 12.3 dB", Optics Express 19, 25763 (2011); M. Metmet et al., "Observation of Squeezed Light with 10-dB Quantum-Noise Reduction", Phys. Rev. Lett. 100, 033602 (2008); Luc Boivin, *Squeezing in Optical Fibers*, Ph.D. Thesis, MIT (1996). As explained in these references, squeezed light states can be and have been generated through the use optical parametric amplification, parametric oscillation, second harmonic generation, and propagation through optical fiber with Kerr nonlinearities. (This last technique enables the squeezing to occur within the fiber of a fiberoptic system.) As described in the second reference above, light squeezing has been performed using laser light with a 1550 nm wavelength. This wavelength falls within the telecommunications band, enabling the use of standard fibers to provide minimal transmission loss per kilometer. The references show that squeezing factors of 10 dB are possible, which should translate to a 10 dB reduction in the quantum noise level. Such a SNR improvement is equivalent to increasing the signal power by a factor of 10.

Figure 4:
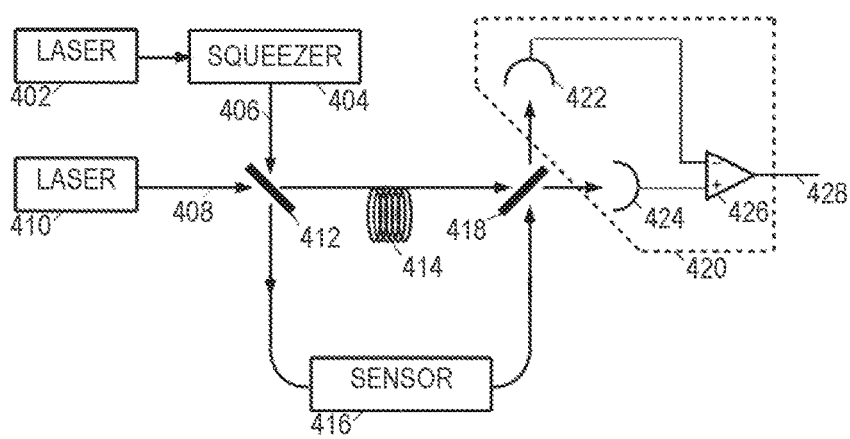
FIG. 4 shows an illustrative squeezed light interferometer suitable for downhole sensing.

FIG. 4 shows an illustrative squeezed light interferometer suitable for downhole sensing. A laser 402 emits a coherent beam, preferably at a wavelength that can be readily propagated by optical fiber. A squeezer module 404, converts the coherent beam into a phase-squeezed state 406, i.e., a beam of light in a phase-squeezed vacuum state $|0, r\rangle$, where r is the squeeze parameter that specifies the minimum mean deviation (the small axis of the uncertainty region):

$$<\Delta^2 Q(\gamma)> = \frac{1 - 2e^{-|r|}\sinh|r|}{2}$$

The vacuum noise level (½) exists at r=0. As $|r|$ increases to infinity, the noise level decreases monotonically to zero. Any of the foregoing squeeze techniques can be employed to provide a beam with a squeeze parameter r that at least exceeds a value of two. The squeeze direction $\gamma$ relative to the specified quadratures can be varied without affecting the degree of squeezing. As mentioned previously, the minimum uncertainty should be aligned with the phase quadrature.

A laser 410, which may or may not be a separate laser than laser 402, directs a coherent beam 408 (in a coherent state $|\alpha\rangle$) to a beam splitter 412 that combines the beams 406 and 408 to form two phase-squeezed laser beams. The combination of the lasers 402, 404, the phase squeezer module 404, and the coupler or beam splitter 412 used to combine the coherent state with the phase-squeezed vacuum state, may herein be referred to as a phase-squeezer assembly.

The beam splitter 412 directs one of the phase-squeezed laser beams along a reference path 414 and the other along a sensing path 416. The sensing path 416 provides the phase-squeezed laser beam with a delay or phase shift that is indicative of some physical quantity, e.g., acceleration, velocity, displacement, rotation, temperature, pressure, or an external magnetic, electric, or electromagnetic field. In some embodiments, the sensor is a discrete, localized sensor ("point sensor"), while in other embodiments the fiber itself acts as a distributed sensor. In both embodiments, the sensing may occur downhole.

The reference path 414 may include a 90° phase shift relative to the sensing path 416 in its quiescent state, so that when the phase-squeezed laser beams from the reference and sensing paths are re-combined by beam splitter 418, the recombined beam demonstrates destructive interference at the sensor's base state. The recombined beams from beam splitter are provided to a receiver 420 having two photodetectors 422, 424, whose resulting currents are combined with a 180° power combiner 426 to yield an electrical sense signal 428. Where the phase change in the sensing path is δφ, the sense signal 428 is proportional to $$\chi \sim (|\alpha|^2 - \sin h^2 r) \sin \delta\phi,$$

or, without the 90° phase shift in the reference path 414, $$\chi \sim (|\alpha|^2 - \sin h^2 r) \cos \delta\phi.$$

The signal-to-noise ratio becomes $$SNR = e^r |\alpha| \sin \delta\phi = e^r [n]^{1/2} \sin \delta\phi,$$

where r is the squeeze parameter, α is the amplitude of the coherent light, and [n] is the average photon number. The minimum detectable phase change is then:

$$\delta\phi_{min} = e^{-r} [n]^{-1/2}.$$

As r increases, the resolution improves.

The embodiment of FIG. 4 employs a Mach-Zender interferometer configuration. Squeezing can be used to similar effect with other interferometer configurations including Sagnac, Michelson, and Fabry-Perot interferometers. For example, FIG. 6 (discussed further below) employs a Michelson interferometer configuration.

Figure 5:
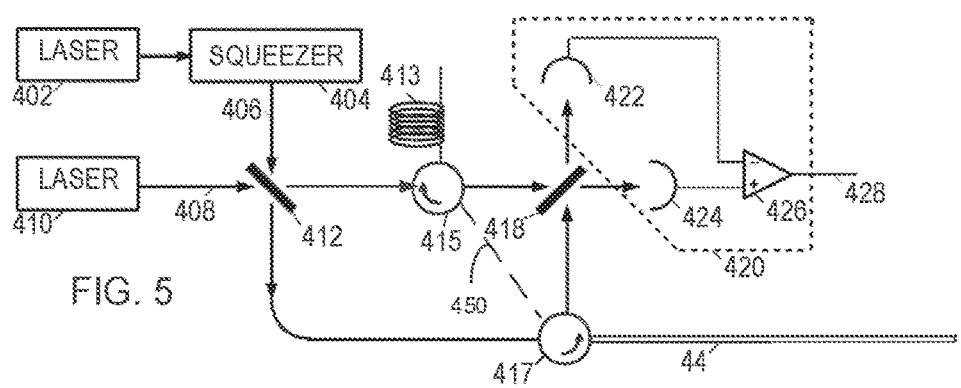
FIG. 5 shows an illustrative distributed array sensing system employing squeezed light interferometry.

FIG. 5 shows a distributed sensing system employing squeezed light interferometry with backscattered light. Elements similar to the embodiment of FIG. 4 are numbered similarly. The reference path 414 and the sensing path 416 of FIG. 4 each provided transmitted light to beam splitter 418, and are replaced in FIG. 5 by distributed sources of backscattered light. The sensing path 416 is replaced by a distributed sensing cable 44 and a circulator 417. The circulator 417 directs light from beam splitter 412 to the distributed sensing cable 44, and directs backscattered light from the sensing cable 44 to beam splitter 418. Similarly, reference path 414 is replaced by a length of optical fiber 413 that creates backscattered light in a similar fashion to cable 44, and a circulator 415 that forwards the backscattered light to beam splitter 418. One contemplated variation of this embodiment includes an acousto-optic modulator (AOM) in the reference path (e.g., between beam splitter 412 and circulator 415) to provide a small frequency offset between the light propagating along each path. In this and other contemplated embodiments, cable 44 and fiber 413 may be embodied as different propagation modes in the same fiber 450, illustrated as a dotted line. For example, a polarization maintaining fiber 450 can use one polarization mode to serve as one optical path in the interferometer, and an orthogonal polarization mode to serve as the second optical path in the interferometer.

To enable the measurements of receiver 420 to be associated with specific positions along the cable 44, the lasers 402, 410 may be synchronously gated to form a sequence of phase-squeezed laser pulses with an inter-pulse spacing greater than the round trip travel time along the cable 44 to avoid overlap between the responses to adjacent pulses. (To provide such gating, a pulse generator can be used to supply a clock signal to each of multiple optical attenuators.) The pulses propagate along the distributed sensing cable 44 (and optical fiber 413), generating backscattered light signals as they encounter scattering centers along the fiber. The time required for the backscattered light to reach receiver 420 is directly related to the position of the scattering centers, enabling digitized values of the sense signal 428 to be associated with specific positions along the cable 44. Similar results can be achieved through the use of continuous wave modulation of lasers 402, 410

Figure 6:
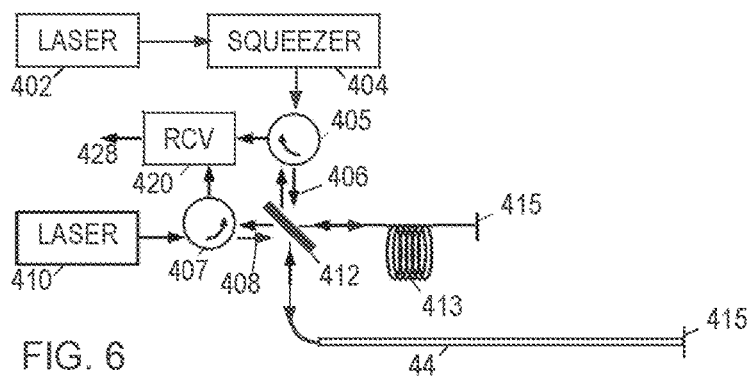
FIG. 6 shows an illustrative distributed fiber sensing system employing squeezed light interferometry.

FIG. 6 shows another embodiment of a distributed sensing system employing squeezed light interferometry, but with a Michelson interferometer configuration rather than a Mach-Zender configuration. Circulator 405 forwards the phase squeezed state 406 from the squeezer 404 to the beam splitter 412, and the recombined backscattered light from beam splitter 412 to receiver 420. Similarly, circulator 407 forwards the coherent state 408 from laser 410 to beam splitter 412 and the recombined backscattered light from beam splitter 412 to receiver 420. As before, beam splitter 412 provides phase-squeezed light beams to reference fiber 413 and distributed sensing fiber 44, which are shown in FIG. 6 as having reflective terminations 415. The reflected or backscattered light is returned to beam splitter 412, which forms the recombined beams mentioned above. As with the embodiment of FIG. 5, the lasers 402, 410 may be pulsed or modulated to enable the receiver measurements to be associated with specific positions along fiber 44.

FIG. 7 shows an illustrative squeezed light interferometry method. In block 702, the fiberoptic cable is deployed in the borehole, either by being strapped to a tubing string as the tubing string is lowered into the borehole, or by being transported into place with a weighted end and/or frictional fluid flow. The deployment is completed by connecting the fiberoptic cable to an interface that enables the cable to be interrogated. For distributed sensing, the fiber optic cable itself is interrogated by distributed sensing electronics, whereas for point sensing or array sensing, one or more discrete sensors are integrated into the cable to be interrogated via the cable's optical fibers.

In block 704, the squeezed light sensing system generates a laser beam (having a coherent state) and a beam with a phase-squeezed vacuum state. In optional block 706 each of the beams may be synchronously gated or modulated, e.g., to form a sequence of pulses, so as to facilitate the association of receiver measurements with scattering positions along the cable. In block 708, the beams are combined to form a phase squeezed laser beam. In block 710, the system couples the phase squeezed laser beam to an interferometric sensor configuration having the fiber optic cable on the sensing path. The interferometer output is received in block 712 and analyzed to measure the interferometric phase, optionally for each of multiple positions along the cable. Due to the use of phase squeezed light for sensing, the phase measurement resolution is expected to be significantly enhanced. In block 714, the system digitizes the phase measurements, associates them with position, and provides tracking for the time dependence of the measurements at each position. (Blocks 704-714 are repeated to collect measurements as a function of time.) In block 716, the system processes the phase measurements to derive logs of physical parameter values and to display the logs to the user. For example, the physical parameter values may be acoustic vibrations, electromagnetic fields, gravity, accelerations, gyroscopic measurements, or even telemetry signals. Some point sensor embodiments may be sensitive to chemical species, enabling tracking of chemical composition at each sensor position. Parameters that yield phase shifts proportional to changes in parameter value can be determined by integrating the arcsine of the receiver output.

Numerous variations and modifications will become apparent to those skilled in the art once the above disclosure is fully appreciated. For example, the figures show system configurations suitable for production monitoring, but they are also readily usable for monitoring treatment operations, cementing operations, active and passive seismic surveys, and reservoir and field activity monitoring. It is intended that the following claims be interpreted to embrace all such variations and modifications.

What is claimed is:

1. A downhole sensing system that comprises:
 a phase squeezer assembly that provides a phase-squeezed laser beam by combining a coherent state laser beam from a laser with a phase-squeezed vacuum state;
 an interferometer that directs a reference portion of the phase-squeezed laser beam along a reference path between a first and second beam splitter, wherein the reference path comprises a first circulator coupled to an optical fiber cable and a sensing portion of the phase-squeezed laser beam along a sensing path between the first and second beam splitter, wherein the sensing path comprises a second circulator coupled to the optical fiber cable;
 a downhole sensor along the sensing path to provide the sensing portion of the phase-squeezed laser beam with a measurement-parameter dependent phase shift relative to the reference portion of the phase-squeezed laser beam; and
 a receiver that measures said phase shift.

2. The system of claim 1, including another fiberoptic cable that conveys the phase-squeezed laser beam to the downhole sensor.

3. The system of claim 2, further comprising a processing unit that collects measurements of said phase shift from the receiver and derives a time-dependent parameter for display to a user.

4. The system of claim 3, wherein the parameter is in a set consisting of temperature, pressure, vibration, acceleration, electric field, magnetic field, electromagnetic field, nuclear radiation intensity, and chemical species concentration.

5. The system of claim 1, wherein the downhole sensor is a portion of the optical fiber cable that is configured for distributed sensing.

6. The system of claim 1, further comprising a processing unit that collects measurements of said phase shift from the receiver, associates each phase shift measurement with a position along the fiberoptic cable, and displays a representation of the phase-shift measurements associated with each position.

7. The system of claim 6, wherein the representation is of distributed acoustic, vibration, or seismic energy signals.

8. The system of claim 1, further comprising a pulse generator that gates the phase-squeezed laser beam into a sequence of phase-squeezed laser pulses.

9. The system of claim 1, wherein the phase-squeezer assembly provides a phase-squeezed laser beam with a squeeze parameter r>2.

10. A downhole sensing method that comprises:
 combining a coherent laser beam with a squeezed vacuum state to yield a phase-squeezed laser beam;
 coupling the phase-squeezed laser beam to an interferometer having a reference path between a first and second beam splitter, wherein the reference path comprises a first circulator coupled to an optical fiber cable and a sensing path between the first and second beam splitter that comprises a second circulator coupled to the optical fiber cable and a downhole sensor that provides a measurement-parameter dependent phase shift relative to the reference path; and
 measuring the phase-shift.

11. The method of claim 10, wherein the downhole sensor is part of a downhole sensing array having multiple sensors for providing measurement-parameter dependent phase shifts at different positions.

12. The method of claim 10, wherein the downhole sensor is a portion of the optical fiber cable that provides distributed sensing via photon scattering.

13. The method of claim 12, wherein said coupling includes gating the phase-squeezed laser beam to form a sequence of phase-squeezed laser pulses.

14. The method of claim 13, further comprising shifting, by an acoustic-optic modulator, a frequency of the pulses on the reference path relative to the pulses on the sensing path.

15. The method of claim 12, further comprising associating each measured phase-shift with a corresponding position along the optical fiber cable and tracking a time dependence of the measurement parameter for each said position.

16. The method of claim 15, wherein the measurement parameter is acoustic energy, vibration, or seismic energy.

17. The method of claim 10, wherein the measurement parameter is in a set consisting of temperature, pressure, vibration, acceleration, electric field, magnetic field, electromagnetic field, nuclear radiation intensity, and chemical species concentration.

18. The method of claim 10, wherein the phase-squeezed laser beam has a squeeze parameter r>2.

19. The system of claim 1, wherein the optical fiber cable is a polarization maintaining fiber; and wherein the reference path is a first polarization mode of the polarization maintaining fiber and the sensor path is a second polarization mode of the polarization maintaining fiber; and wherein the first and second polarization modes are orthogonal to each other.

20. The method of claim 10, wherein the optical fiber cable is a polarization maintaining fiber; and wherein the reference path is a first polarization mode of the polarization maintaining fiber and the sensor path is a second polarization mode of the polarization maintaining fiber; and wherein the first and second polarization modes are orthogonal to each other.

21. The system of claim 1, wherein a delay coil adjusts a time of flight for the reference portion of the phase-squeezed laser beam and the sensing portion of the phase-squeezed laser beam, wherein the delay coil causes the reference portion and the sensing portion to reach the receiver at a same time.

22. The method of claim 10, wherein a delay coil adjusts a time of flight for the phase-squeezed laser beam associated with the reference path and the sensor path, wherein the delay coil causes the phase-squeezed laser beam associated with the reference path and the sensor path to reach a receiver at a same time.

* * * * *